Oct. 21, 1969     S. LEES ET AL     3,474,194
PRINTED PHONOTRACK SYSTEM WITH BANDWIDTH REDUCTION

SIDNEY LEES
GEORGE R. KINZIE, JR.
INVENTOR.

Oct. 21, 1969  S. LEES ET AL  3,474,194
PRINTED-PHONOTRACK SYSTEM WITH BANDWIDTH REDUCTION
Filed Feb. 3, 1966  2 Sheets-Sheet 2

SIDNEY LEES
GEORGE R. KINZIE, JR.
INVENTOR.

BY Wm O Moeser

United States Patent Office 3,474,194
Patented Oct. 21, 1969

3,474,194
PRINTED PHONOTRACK SYSTEM WITH BANDWIDTH REDUCTION
Sidney Lees, 15 Dunster Drive, Hanover, N.H. 03755, and George R. Kinzie, Jr., P.O. Box 95, Great Barrington, Mass. 01230
Filed Feb. 3, 1966, Ser. No. 524,883
Int. Cl. G11b *11/12*
U.S. Cl. 179—100.1        5 Claims

ABSTRACT OF THE DISCLOSURE

A number of parallel sound tracks are printed adjacent to the graphical material on a page. Each of these tracks contains spectral components below a predetermined low audio frequency, typically 400 cycles, sufficiently low to be preserved by printing. The respective tracks are simultaneously scanned to provide a corresponding number of first electrical signals that are modulated to provide a corresponding number of modulated first signals with a contiguous array of spectral components between the low audio frequency and a middle audio frequency above the spectral components characterizing sounds recorded on the parallel tracks. An amplifier cumulatively combines the modulated first signals to provide an output electrical signal representative of the sounds and drives a loudspeaker that provides a sound signal corresponding to the recorded sounds.

---

Figure 1:
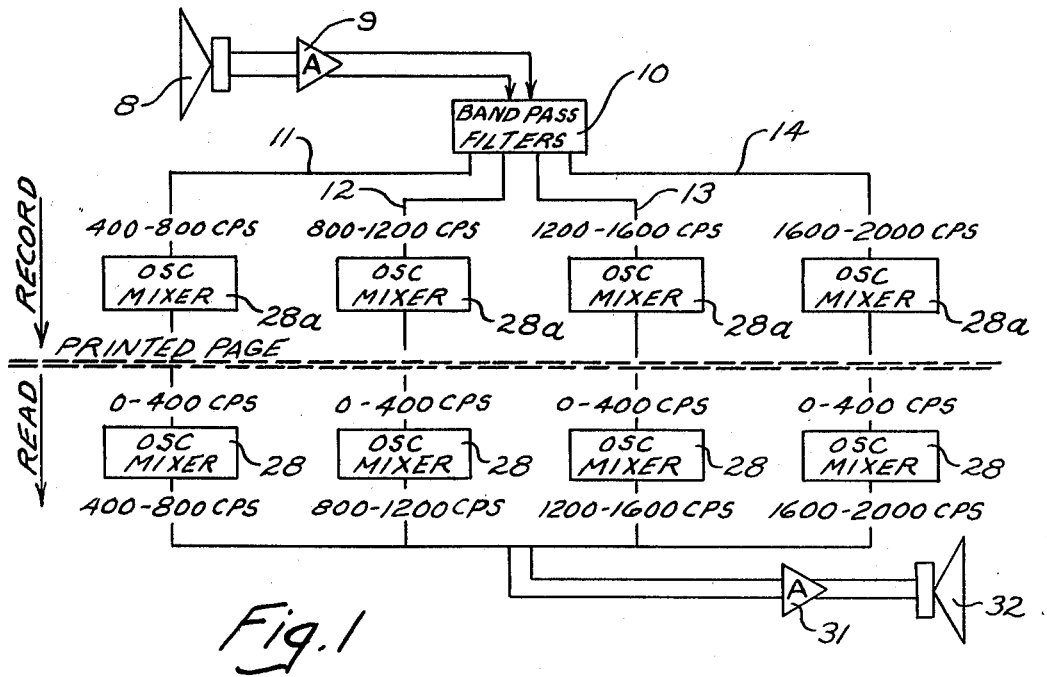

Our invention relates to audio aids of the general type which may be used in conjunction with the printed page. This field has been the subject of numerous inventions, and the prior art includes many devices whereby the reader-listener may relate, simultaneously, the printed word or other visual symbol with an associated sound or series of sounds.

While books may be provided with phonograph records, or recorded tapes, there are available no auditory aids which approach the economy and effectiveness of visual aids—pictures, charts, and the like—which often accompany the printed word. The reason for this is that visual aids have long been applied to the printed page in a printing process essentially like that by which words themselves are printed. Furthermore the space requirements of printed visual aids are commensurate with the space requirements of the printed word so that the two sets of symbols can conveniently appear and be arranged together on the same page.

In the case of auditory aids, the storage of such material has required far more space than the associated printed matter. Furthermore, access to a given segment of information is not convenient. For example, where a "talking book" is accompanied by a recorded tape or film, the reader-listener cannot readily go to a particular page or line for a simultaneous display of both the visual and the auditory information.

In our invention, we supply a system and techniques whereby the foregoing limitations are overcome. We propose to apply to the page graphic symbols which may be in the form of variable area ink patterns (of light and dark) corresponding to the frequency content of the sounds it is desired to supply along with the visual information on that same page. The pattern can be printed along with words and pictures by conventional (and therefore inexpensive) printing processes. The invention will be described in the context of a book in which there is a line of recorded patterns below each line of type. A simple hand-held pickup is used by the reader to scan the pattern as he reads the words, thus directly associating the sound with the printed words and phrases. By novel techniques hereinafter described, the patterns consume no more linear space than the printed line of words so that correlation between word and sound is achieved.

It is sufficient to use a band width of 2000 c.p.s. for normal speech components, yet we have found that offset printing of soundtracks is practical up to only 200 cycles per inch. By conventional methods, a ten-inch line would be consumed for each second of speech, and the scanner would have to be controlled by the user at that same rate of ten inches per second. However, by dividing the speech spectrum into a plurality of channels and by heterodyning or other frequency shifting techniques, each channel can be reduced to a common bandwidth of from substantially 0 to 400 c.p.s. We are thereby able to compress one second of speech into a linear distance of only two inches. A six-inch printed line, for example, may then be read and traversed by a manually held and operated pickup in three seconds; thus we have synchronized the sound with the printed word. From the pickup output, we then restore the channels to their original frequency levels by any convenient frequency translation techniques, combine them electronically, and feed them through a common transducer, to yield the speech and sounds in substantially their original form.

For a more complete understanding of this invention, we refer now to the following additional description and to the drawings, in which—

Figure 2:
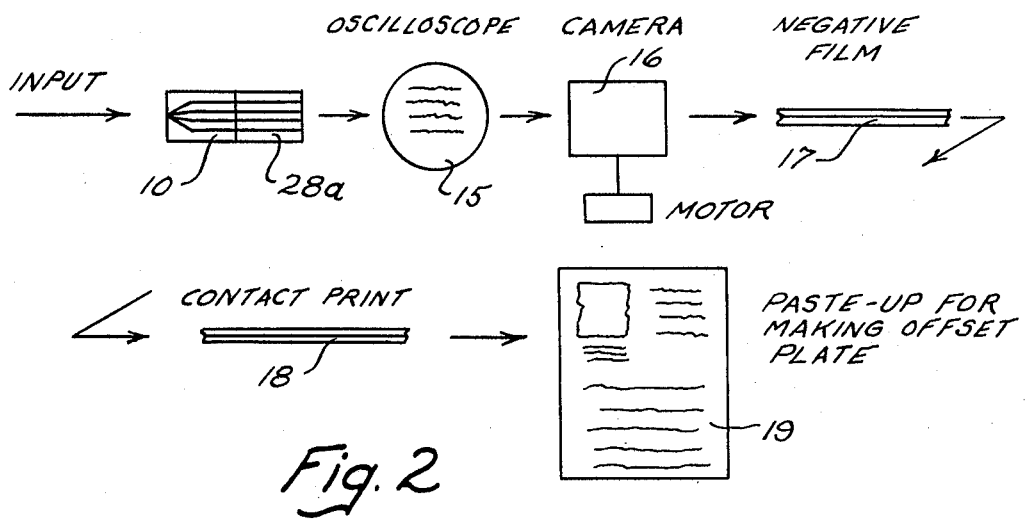
Figure 3:
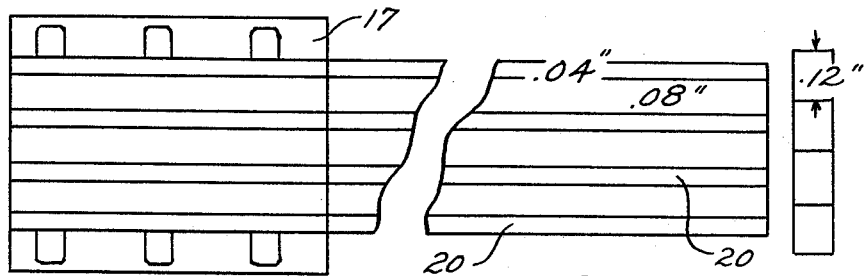
Figure 4:
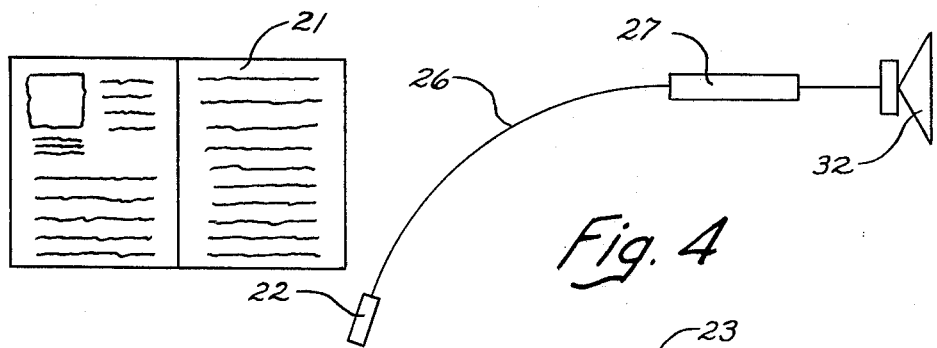
Figure 5A:
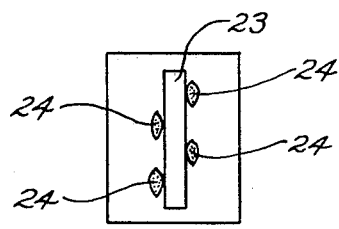
Figure 5:
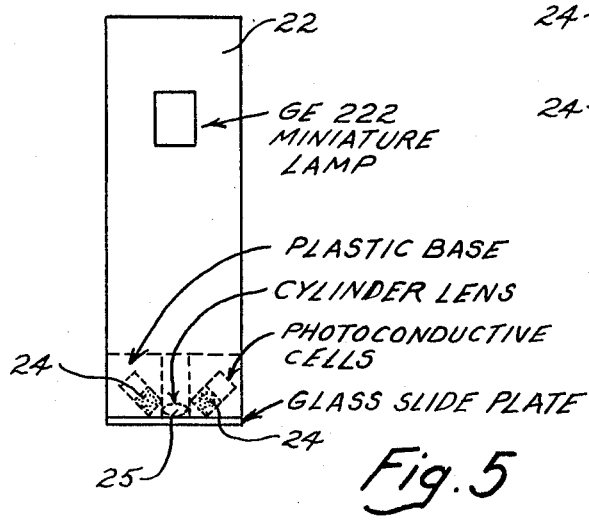

FIGURE 1 is a system block diagram;
FIGURE 2 illustrates the optical system for recording the master and printing same;
FIGURE 3 is a dimensional detail of a sample sound track;
FIGURE 4 is a schematic representation of the pickup, reader and printed page used in the system of FIGURE 1; and
FIGURES 5 and 5a are details, partly in section, of the pickup as described.

Referring now more particularly to FIGURE 1, the input section of the system comprises a microphone 8, an amplifier 9, and four band pass filters shown generally at 10. When a printed line is read aloud, the frequency components of the speech are divided into four channels 11, 12, 13 and 14, which by way of illustration may be as shown: 400 to 800 c.p.s.; 800 to 1200 c.p.s.; 1200–1600 c.p.s.; and 1600 to 2000 c.p.s. For speech these have been found to be satisfactory, but other ranges or additional channels may be desirable or necessary for particular sounds or applications.

All four channels are thereupon reduced to a standard band of substantially 0 to 400 c.p.s. range; the lower two by mixing with a reference frequency of 800 c.p.s., and the upper two by mixing with a reference frequency of 1600 c.p.s. Frequency translation methods well known in the art may be employed. The frequency of channel 11 is subtracted from a 800 c.p.s. reference, and that reference is subtracted from the frequency of channel 12; the frequency of channel 13 is subtracted from a 1600 c.p.s. reference, while that reference is subtracted from the frequency of channel 14. The frequency converters are designated 28a in FIGURE 1 and are oscillator-mixers in function.

Four channels of identical range are thus produced and their outputs are then converted to a master suitable for use in a conventional printing process. This latter process is shown in FIGURE 2. The output of each of the four converters modulates a corresponding channel in a four channel oscilloscope 15. A suitable continuous stripfilm oscilloscopic camera 16 records four parallel tracks simultaneously. The film may be driven at two inches per second to thereby create variable area tracks of each channel.

The resulting negative 17 may be then printed at 18 and used to set up an offset plate 19 for mass printing along with words, pictures, or other associated visual material.

The four-track strip is shown, greatly enlarged, in FIGURE 3. Each variable zone 20 may (for example) be .04 of an inch in width, with a separation between channels of .08 inch.

From the printed page of the book 21, FIGURE 4, to the auditory output, the foregoing process is essentially reversed. We provide a suitable transducer in the form of a hand held pickup 22 shown in FIGURE 5. The pickup 22 contains a light source which projects, through a simple cylindrical lens 25, a narrow band of light 23 (FIGURE 5a) onto the paper and against the four variable area tracks. The light band 23 is masked off into four separate channels, each having a system of light sensitive cells 24, one set being shown for convenience. The simple cylindrical lens 25 directs light onto the track; the light is then reflected from the track to the cell system, the output of which is then carried via a flexible cable 26 to the reader 27. It should be understood that there are four sets of lens-cell combinations, each reading a designated channel. We have found that an aperture of .120 of an inch adequately covers each channel and yet allows room for an acceptable tolerance in the degree of accuracy with which the pickup 22 is caused to traverse a printed line. With the dimensions shown in FIGURE 4, wandering from a straight line of .04 inch is permissible without producing any cross effects between channels.

The outputs from the pickup 22 are then fed into four frequency converters 28 as shown on the system plan of FIGURE 1. When the pickup 22 is scanned across the page at two inches per second, four channel outputs are produced, each in a range of substantially 0 to 400 c.p.s.

The converters subtract the frequency of the signal of channel 11 from a reference of 800 c.p.s., and add the frequency of channel 12 to that reference; subtract the frequency of the signal of channel 13 from a reference of 1600 c.p.s., and add the frequency of the signal of channel 14 to that reference.

As explained earlier, the function of the converter in the reader is to restore the original frequency to the low frequency signals received from the pickup. It has four identical sections, one for each channel's pickup. Each section is designed to act as a single-sideband modulator; the modulating signal is the one received from the pickup, and the reference frequency, which serves as the carrier, is supplied by an oscillator. These modulators may be adjusted to select either the sum or the difference sideband for flexibility in design.

The outputs of the four channels, thus restored to their original frequency ranges, are combined, suitably amplified at 31 and applied to drive a loudspeaker 32 or earphones as desired. Thus the original speech or sounds are recreated from the printed page.

While we describe sound tracks printed in conventional black ink, we can also carry out the system using certain magnetic inks recently developed and amenable to mass production printing processes. In such cases the pickup 22 would be replaced by a compatible magnetic head pickup similarly arranged in multi-channels.

Another possible variation is to combine magnetic and conventional inks and a pick-up with both optical and magnetic heads. Further, various colors other than black may be used with optical filters for greater flexibility and channel separation.

With the phonotrack system hereinabove described, certain fundamental advantages are realized over prior art devices; and these all derive from the fact that the auditory information is stored in the same manner as the visual printed matter itself; and, therefore, a talking book can be produced by printing alone. Furthermore, the space needed for the printed auditory track is compatible with the space occupied by the printed words themselves. This is a great advantage in that it enables words and sounds to be directly correlated. Foreign language texts, of course, are greatly enhanced in effectiveness by this system. The invention is also applicable to children's texts and story books, in which the "printed" sounds (not necessarily words) may be readily associated with words or pictures.

Each line of information is thus immediately accessible to the user, and does not have to be retrieved by mechanical means. With a little practice, the travel of the pickup can be controlled well within acceptable limits; the continuous audio response providing the feedback necessary for the user to adjust his scanning speed correctly. Moreover, because of the translation to high frequencies, the error in the reproduced pitch becomes a smaller fraction of the error in the user's scanning speed.

We have described one method of carrying out our invention, using subcomponents functioning in ways well understood in this art. However, the system provides means for producing books at low cost. The reader may be mass produced at reasonable cost with miniaturized electrical components.

We intend to comprehend within our inventive concept all variations in specific designs which are within the spirit and scope of the following claims.

We claim:

1. Apparatus for deriving sounds characterized by spectral components below a middle audio frequency and printed upon a plurality of generally parallel tracks related to graphical material printed adjacent to said tracks comprising, graphic means for carrying said plurality of tracks and said adjacent printed material, said tracks coacting to comprise means for recording said sounds with each track recording a range of spectral components less than a predetermined low audio frequency sufficiently low to permit recording by printing, means for simultaneously scanning said tracks to provide a corresponding plurality of first electrical signals having spectral components below said predetermined low audio frequency, means for modulating said plurality of first electrical signals to provide a corresponding plurality of modulated first signals with a contiguous array of spectral components between at least said low audio frequency and said middle range audio frequency, means for cumulatively combining said modulated first signals to provide an output electrical signal representative of said sounds, and transducing means responsive to said output electrical signal for providing a sound signal corresponding to said sounds.

2. Apparatus for deriving sounds in accordance with claim 1 wherein said means for modulating comprises a corresponding plurality of single sideband modulators each providing a respective one of said modulated first signals.

3. Apparatus in accordance with claim 2 wherein said first low frequency is substantially 400 Hz.

4. Apparatus in accordance with claim 3 wherein said middle audio frequency is substantially 2000 Hz.

5. Apparatus in accordance with claim 4 wherein said plurality is 4.

(References on following page)

References Cited

UNITED STATES PATENTS

| | | | |
|---|---|---|---|
| 1,396,178 | 11/1921 | Foley | 179—100.1 |
| 1,812,405 | 6/1931 | Ives | 179—15.55 |
| 1,951,454 | 3/1934 | Tiefenbacher | 346—74 X |
| 2,006,890 | 7/1935 | Grossman | 179—100.3 |
| 2,181,265 | 11/1939 | Dudley | 179—100.1 |
| 2,369,572 | 2/1945 | Kallmann | 179—100.3 X |
| 3,277,245 | 10/1966 | Sponga | 179—100.2 |

BERNARD KONICK, Primary Examiner

R. F. CARDILLO, Jr., Assistant Examiner

U.S. Cl. X.R.

178—6.6